(12) United States Patent
Armstrong

(10) Patent No.: US 11,836,002 B2
(45) Date of Patent: *Dec. 5, 2023

(54) PROTECTIVE CASE FOR A COMPUTING DEVICE AND METHOD OF USE

(71) Applicant: Urban Armor Gear, LLC, Laguna Niguel, CA (US)

(72) Inventor: Steven Armstrong, Laguna Niguel, CA (US)

(73) Assignee: Urban Armor Gear, LLC, Laguna Niguel, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/961,461

(22) Filed: Oct. 6, 2022

(65) Prior Publication Data

US 2023/0176611 A1 Jun. 8, 2023

Related U.S. Application Data

(63) Continuation of application No. 17/140,546, filed on Jan. 4, 2021, now Pat. No. 11,467,629, which is a
(Continued)

(51) Int. Cl.
*G06F 1/16* (2006.01)
*G06F 1/20* (2006.01)
*A45C 11/00* (2006.01)

(52) U.S. Cl.
CPC ............ *G06F 1/1613* (2013.01); *A45C 11/00* (2013.01); *G06F 1/1616* (2013.01); *G06F 1/203* (2013.01);
(Continued)

(58) Field of Classification Search
CPC .............. A45C 11/00; A45C 2011/002; A45C 2011/003; A45F 3/02; A45F 5/00;
(Continued)

(56) References Cited

U.S. PATENT DOCUMENTS 1,613,536 A 1/1927 Rose
4,259,568 A 3/1981 Dynesen
(Continued)

FOREIGN PATENT DOCUMENTS

CN 201047923 Y 4/2008
CN 204635340 U 9/2015
(Continued)

OTHER PUBLICATIONS

Non-Final Office Action Received for U.S. Appl. No. 15/335,379 dated Aug. 23, 2019, 15 pages.
(Continued)

*Primary Examiner* — Bryon P Gehman
(74) *Attorney, Agent, or Firm* — Neal, Gerber & Eisenberg LLP

(57) ABSTRACT

A method of protecting a computing device is provided including detachably connecting a leading edge of a base portion of the computing device to one or more device receiving members of a first portion of a case. The trailing edge of the base portion is secured to the first portion of the case. The first portion of the case may substantially envelope the base portion of the computing device and a plurality of perimetral fastening members may be detachably connected to a second portion of the case. The perimetral fastening members may detachably connect to perimetral edges of a screen portion of the computing device. A protective shell may be formed around the computing device by pivoting adjoining edges of the first and second portions of the case about a linking pliable member in communication with the trailing edge of the computing device.

20 Claims, 12 Drawing Sheets

Related U.S. Application Data continuation of application No. 15/761,536, filed as application No. PCT/US2016/054870 on Sep. 30, 2016, now Pat. No. 10,884,453.

(60) Provisional application No. 62/239,280, filed on Oct. 9, 2015.

(52) U.S. Cl.
CPC ... *A45C 2011/002* (2013.01); *A45C 2011/003* (2013.01); *G06F 1/1626* (2013.01); *G06F 2200/1633* (2013.01)

(58) Field of Classification Search
CPC .... G06F 1/1613; G06F 1/1616; G06F 1/1626; G06F 1/20; G06F 1/203; G06F 2200/1633
See application file for complete search history.

(56) References Cited

U.S. PATENT DOCUMENTS

| | | |
|---|---|---|
| 5,263,423 A | 11/1993 | Anderson |
| 5,632,373 A | 5/1997 | Kumar et al. |
| 5,682,993 A * | 11/1997 | Song ............... G06F 1/1628 361/679.55 |
| 5,706,168 A | 1/1998 | Erler et al. |
| 6,262,886 B1 | 7/2001 | Difonzo et al. |
| 6,267,236 B1 | 7/2001 | Seok |
| D456,398 S | 4/2002 | Horiki |
| 6,772,879 B1 | 8/2004 | Domotor |
| 7,007,912 B1 | 3/2006 | Giuliani et al. |
| 7,191,926 B1 * | 3/2007 | Costantino ............... A45C 3/02 224/616 |
| 7,281,698 B2 | 10/2007 | Patterson |
| D558,754 S | 1/2008 | Takemasa et al. |
| 7,414,833 B2 | 8/2008 | Kittayapong |
| 7,641,046 B2 | 1/2010 | Tsang et al. |
| 7,643,274 B2 * | 1/2010 | Bekele ............... G06F 1/1616 361/679.55 |
| 7,672,117 B1 | 3/2010 | Gary et al. |
| 7,735,644 B2 | 6/2010 | Sirichai et al. |
| D623,644 S | 9/2010 | Hsu et al. |
| 7,886,903 B1 | 2/2011 | Wurzelbacher et al. |
| 7,907,400 B2 * | 3/2011 | Bekele ............... G06F 1/203 361/679.55 |
| 7,938,260 B2 | 5/2011 | Lin |
| D649,149 S | 11/2011 | Peng |
| D658,187 S | 4/2012 | Diebel |
| D658,188 S | 4/2012 | Diebel |
| D663,304 S | 7/2012 | Akana et al. |
| 8,230,992 B2 | 7/2012 | Law et al. |
| 8,245,843 B1 | 8/2012 | Wu |
| D670,279 S | 11/2012 | Veltz et al. |
| 8,310,826 B2 * | 11/2012 | Wu ............... G06F 1/1613 220/23.91 |
| 8,312,991 B2 | 11/2012 | Diebel et al. |
| D671,948 S | 12/2012 | Akana et al. |
| D672,353 S | 12/2012 | Liu |
| D672,781 S | 12/2012 | Lu |
| D675,625 S | 2/2013 | Hasbrook et al. |
| 8,372,495 B2 * | 2/2013 | Kenney ............... G06F 1/16 428/34.1 |
| D678,260 S | 3/2013 | Bau |
| D679,279 S | 4/2013 | Yang et al. |
| D679,715 S | 4/2013 | Akana et al. |
| 8,424,830 B2 | 4/2013 | Yang et al. |
| D681,641 S | 5/2013 | Van et al. |
| D682,836 S | 5/2013 | Akana et al. |
| D682,838 S | 5/2013 | Akana et al. |
| D687,438 S | 8/2013 | Lu |
| D689,056 S | 9/2013 | Li |
| D690,305 S | 9/2013 | Wen |
| D690,702 S | 10/2013 | Chung |
| D690,704 S | 10/2013 | Padilla et al. |
| D691,142 S | 10/2013 | Diebel |
| D692,434 S | 10/2013 | Kim |
| D693,141 S | 11/2013 | Wootten |
| D693,823 S | 11/2013 | Chen et al. |
| D695,296 S | 12/2013 | Hsu |
| D696,253 S | 12/2013 | Akana et al. |
| D696,256 S | 12/2013 | Piedra et al. |
| D696,669 S | 12/2013 | Akana et al. |
| 8,638,555 B2 | 1/2014 | Bekele |
| 8,640,864 B2 | 2/2014 | Chen et al. |
| 8,644,893 B2 | 2/2014 | Liang |
| 8,657,112 B2 | 2/2014 | Igarashi |
| D701,205 S | 3/2014 | Akana et al. |
| D702,673 S | 4/2014 | Murchison et al. |
| D702,679 S | 4/2014 | Li |
| D704,689 S | 5/2014 | Chang |
| D704,693 S | 5/2014 | Kim |
| D706,270 S | 6/2014 | Akana et al. |
| D706,272 S | 6/2014 | Poon |
| D706,783 S | 6/2014 | Almodova |
| D707,229 S | 6/2014 | Almodova |
| 8,757,375 B2 | 6/2014 | Huang |
| D708,838 S | 7/2014 | Lee |
| 8,763,795 B1 | 7/2014 | Oten et al. |
| 8,766,921 B2 | 7/2014 | Ballagas et al. |
| 8,773,353 B2 | 7/2014 | Wei |
| 8,783,458 B2 | 7/2014 | Gallagher et al. |
| D710,859 S | 8/2014 | Mecchella et al. |
| 8,797,132 B2 | 8/2014 | Childs et al. |
| D718,316 S | 11/2014 | Veltz et al. |
| D724,093 S | 3/2015 | Dong |
| D724,594 S | 3/2015 | Venida et al. |
| D725,116 S | 3/2015 | Li |
| D727,917 S | 4/2015 | Yeo |
| D729,255 S | 5/2015 | Kilkenny |
| D731,494 S | 6/2015 | Barfoot et al. |
| D733,149 S | 6/2015 | Dahlberg |
| D733,154 S | 6/2015 | Armstrong et al. |
| D737,263 S | 8/2015 | Armstrong et al. |
| D737,276 S | 8/2015 | Armstrong et al. |
| 9,128,683 B2 * | 9/2015 | Wong ............... G06F 1/1628 |
| 9,215,916 B2 * | 12/2015 | Kim ............... A45C 11/00 |
| D750,084 S | 2/2016 | Nguyen et al. |
| D752,052 S | 3/2016 | Park |
| 9,315,004 B2 * | 4/2016 | Balaji ............... G06F 1/16 |
| D763,853 S | 8/2016 | Pearce |
| D766,249 S | 9/2016 | Veltz et al. |
| D784,350 S | 4/2017 | Li |
| 9,634,519 B2 * | 4/2017 | King ............... G06F 1/263 |
| D790,550 S | 6/2017 | Chen |
| D803,221 S | 11/2017 | Guo |
| D804,468 S | 12/2017 | Armstrong et al. |
| D806,080 S | 12/2017 | Chen |
| D807,366 S | 1/2018 | Chen |
| D807,369 S | 1/2018 | Chen |
| D808,973 S | 1/2018 | Chen |
| D811,412 S | 2/2018 | Mccurdy |
| D812,620 S | 3/2018 | Cheng |
| D821,405 S | 6/2018 | Chen |
| 10,051,933 B2 * | 8/2018 | Rogers ............... A45C 11/00 |
| D850,456 S | 6/2019 | Armstrong et al. |
| 2003/0034263 A1 | 2/2003 | D'Hoste |
| 2003/0217940 A1 | 11/2003 | Russell et al. |
| 2004/0217027 A1 | 11/2004 | Harris et al. |
| 2006/0060485 A1 | 3/2006 | Picot et al. |
| 2006/0226040 A1 | 10/2006 | Medina |
| 2008/0302687 A1 | 12/2008 | Sirichai et al. |
| 2008/0308437 A1 | 12/2008 | Lin |
| 2009/0159763 A1 | 6/2009 | Kim |
| 2009/0229497 A1 | 9/2009 | Persico et al. |
| 2010/0044259 A1 | 2/2010 | Wang |
| 2010/0096284 A1 | 4/2010 | Bau |
| 2010/0122756 A1 | 5/2010 | Longinotti-buitoni |
| 2010/0147737 A1 | 6/2010 | Richardson et al. |
| 2010/0314266 A1 | 12/2010 | Hartmann |
| 2011/0147398 A1 | 6/2011 | Ahee et al. |
| 2011/0266194 A1 | 11/2011 | Bau |
| 2011/0290687 A1 | 12/2011 | Han |

(56) References Cited

U.S. PATENT DOCUMENTS

| | | |
|---|---|---|
| 2011/0294542 A1 | 12/2011 | Ray et al. |
| 2011/0310553 A1 | 12/2011 | Hsiao |
| 2011/0317339 A1 | 12/2011 | Wu et al. |
| 2012/0018325 A1 | 1/2012 | Kim |
| 2012/0075799 A1 | 3/2012 | Pollex |
| 2012/0211377 A1 | 8/2012 | Sajid |
| 2012/0211613 A1 | 8/2012 | Yang et al. |
| 2012/0305413 A1 | 12/2012 | Chung |
| 2012/0305422 A1 | 12/2012 | Vandiver |
| 2012/0308981 A1 | 12/2012 | Libin et al. |
| 2013/0015088 A1 | 1/2013 | Wu |
| 2013/0020216 A1 | 1/2013 | Chiou |
| 2013/0092562 A1 | 4/2013 | Wyner et al. |
| 2013/0140203 A1 | 6/2013 | Chiang |
| 2013/0213838 A1 | 8/2013 | Tsai et al. |
| 2013/0214661 A1 | 8/2013 | Mcbroom |
| 2013/0241381 A1 | 9/2013 | Dukerschein et al. |
| 2013/0264459 A1 | 10/2013 | Mccosh et al. |
| 2014/0048441 A1* | 2/2014 | Tages .................. G06F 1/1633 206/521 |
| 2015/0068934 A1 | 3/2015 | Armstrong |
| 2017/0023985 A1 | 1/2017 | Xin et al. |
| 2017/0023986 A1 | 1/2017 | Xin et al. |
| 2017/0045920 A1 | 2/2017 | Armstrong et al. |
| 2018/0110306 A1 | 4/2018 | Armstrong |
| 2021/0177115 A1* | 6/2021 | Brown .................. A45F 5/00 |

FOREIGN PATENT DOCUMENTS

| | | |
|---|---|---|
| CN | 109863092 A | 6/2019 |
| WO | WO 2017062285 A1 | 4/2017 |
| WO | WO 2018080841 A1 | 5/2018 |
| WO | DM/098393 | 3/2019 |
| WO | DM/098393 | 5/2019 |

OTHER PUBLICATIONS

"Extended European Search Report received for EP Application No. 16854122.5, dated Apr. 24, 2019", dated Apr. 24, 2019.

"Final Office Action Received for U.S. Appl. No. 15/335,379 dated Jan. 30, 2019, 9 pages", dated Apr. 26, 2018.

"Final Office Action received for U.S. Appl. No. 15/335,379, dated Feb. 19, 2020, 10 Pages".

"International Preliminary Report on Patentability received for PCT Application No. PCT/US2016/054870, dated Apr. 10, 2018", dated Apr. 10, 2018.

"International Preliminary Report on Patentability Received for WO Application PCT/US20171057012, dated May 9, 2019, 10 pages."

"International Search Report and Written Opinion received for PCT Application No. PCT/US2016/054870, dated Jan. 24, 2017", dated Jan. 24, 2017.

"International Search Report and Written Opinion Received for WO Application PCT/US2017/057012, dated Feb. 26, 2018".

"Notice of Allowance received for U.S. Appl. No. 29/535,356 dated May 6, 2016."

"Notice of Allowance received for U.S. Appl. No. 29/582,304 dated Sep. 11, 2017."

- "Notice of Allowance received for U.S. Appl. No. 29/635,557, dated Feb. 25, 2019".

"Final Office Action received for U.S. Appl. No. 15/335,379, dated Apr. 21, 2020, 9 Pages".

\* cited by examiner

PROTECTIVE CASE FOR A COMPUTING DEVICE AND METHOD OF USE

CROSS-REFERENCE TO RELATED APPLICATIONS

This Application is a continuation of U.S. patent application Ser. No. 17/140,546 filed on Jan. 4, 2021, now U.S. Pat. No. 11,467,629, which is a continuation of U.S. patent application Ser. No. 15/761,536 filed Mar. 20, 2018, now U.S. Pat. No. 10,884,453, which is a national stage entry of International Patent Application Serial No. PCT/US2016/054870 filed Sep. 30, 2016, which claims priority to U.S. Provisional Patent Application Ser. No. 62/239,280, filed Oct. 9, 2015, the contents of each of which are hereby incorporated by reference in their entirety.

FIELD

This disclosure relates generally to protective cases for computing devices and more particularly, protective cases for mobile computing devices such as smart phones, tablets, PDAs, and laptops.

BACKGROUND

With increasing regularity, protective cases are being constructed for a variety of computing devices such as smart phones, tablets, PDAs and/or other portable computing devices. Their respective designs vary, ranging between degrees of protection as well as facilitating use of the computing device in a more protected environment.

Cases have been known to be constructed from molding using silicon or thermoplastic polyurethane rubber that provides some basic protection against drops and scratches. Other case designs have been constructed from relatively stiffer injected plastics such as polycarbonate. The design and construction of the known cases therefore vary depending on the desired amount of protection, costs, and consideration for certain materials and mounting schemes balanced with features that facilitate performance of the computing device itself. For example, certain material may provide basic structural protection and be relatively cheap, but this material may induce too much friction (e.g. grip) to the user that interferes with easy attachment of the case with the device or grip with other articles such as parts of the user's body or other objects foreign to the case.

In addition to material selection, cases can suffer from being too bulky and difficult to stow away. It is also known that materials for certain cases can degrade over time thereby diminishing protective capabilities of the case as well as loosening its attachment with the computing device. Aesthetically, a worn case also diminishes the overall impression of the case and the attached computing device. Such cases can also have reduced bulk versus their rubber counterparts. Plastic injected mold cases can suffer from passing on relatively high material stresses to the computing device itself due to the differing elasticity and cushioning. For computing devices with sensitive displays or input devices, such protective devices therefore may not be desirous.

Certain hybrid combinations have therefore been designed to combine each approach with the softer, cushion portions being placed in communication with the computing device whereas the exterior portion being constructed from the less bulky, injected plastic. Yet, even with these hybrid solutions, stress tests to the computing devices caused by normal use through drops or collisions can lead to device damage and case separation. In turn, the user may have to fix the device, buy a new one, and/or re-assemble the case with the computing device. Furthermore, many cases fail to completely protect or envelope the associated computing device which unnecessarily risks structural harm to the computing device.

Therefore, a need exists to resolve these and other problems in the art.

SUMMARY

The following simplified summary is provided in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

A case for a computing device may include first and second portions. The first portion may be operatively connected to the second portion and each portion may have an internal device receiving surface and an external device protecting surface. One or more device receiving members may be disposed on the first portion. A plurality of perimetral fastening members may be disposed on the second portion and each perimetral fastening member may be operable to detachably fasten to the computing device.

Perimetral edges of the first and second portions may be operable to flex outwardly when detachably fastening to and securely enveloping the computing device. At least one of the perimetral fastening members may be centrally positioned on an upper edge of the second portion.

In some embodiments, at least one perimetral fastening member that is an inwardly extending lip. The one or more perimetral fastening members may be operable to flex outwardly. The inwardly extending lip may also secure the computing device when the computing device is in communication with the device receiving surface of the second portion.

At least two of the perimetral fastening members may be corner fastening members disposed in opposing corners of the second portion. In this embodiment, the corner fastening members may extend outwardly from the device protecting surface and terminate in a lip portion to secure the computing device. An inwardly extending portion of the lip portion in this embodiment may be operable to form a friction fit with the computing device. Each corner fastening member may include a central portion extending outwardly further than and disposed between corresponding shoulder portions of each fastening member. Each corner fastening member may also be structurally reinforced with and operable to reduce impact and shock to the computing device when enveloped by the case. In certain embodiments, the corner fastening member may be constructed from material more rigid than a remainder of the second portion.

In other embodiments, the internal device receiving surfaces and the external device protecting surfaces of each portion may be flexibly connected along adjoining edges through a linking member such as a pliable fastening member. The linking member may extend at least across one-half length of a total length of the adjoining edges but may also extend less than or greater than one-half as needed or desired. The linking member may extend partially into a recess of each of the first and second portions. In this embodiment, the case may be operable to pivot or rotate about an axis of the linking member between closed and open states. The linking member may be constructed from one or a combination of a polymer, elastomer, fabric, and plastic and/or may be integrally formed with the first and second portions of the case or detachably connected to one or both of the first and second portions.

In certain embodiments, the first portion can also include a plurality of perimetral fastening members. In the closed state, centrally positioned perimetral fastening members on opposing lateral edges of the first and second portion may be in communication to form a shell defined between adjoining external device protecting surfaces of the first and second portions. The shell may be formed to form a protective bubble or enclosure for securely housing the computing device.

In other embodiments, an external shield portion may be integrally formed with or detachably connected to the first or second portions of the case. The external shield portion may include one or a plurality of impact resistant corners or perimetral members. The one or plurality of impact resistant or resilient portions may be constructed from foam, a polymer, or an elastomer.

Optionally, the external device protecting surface may be constructed with a reinforced honeycomb design. The case is not so limited, however, and the case may instead be constructed from a single material. The perimetral edge may be operable to flex outwardly and remaining portions of the external device protecting surface are impact resistant.

The case may optionally include one or more cutout or window portions disposed on perimetral edges of the first or second portions providing access to actuators of the computing device and/or visibility to one or more optical systems of the computing device. The external device protecting surfaces and the perimetral edges of the first and second portions may also be integrally formed with or detachably connected to each other.

In other embodiments, perimetral edges of the first and second portion each may extend away from respective external device protecting surfaces and terminate in an inwardly extending lip. The perimetral edge may also be operable to flex outwards and the inwardly extending lip may be operable to securely retain the computing device.

In other embodiments, a case for protecting a computing device is provided with first and second portions. The first portion may be operatively connected to a second portion through a linking member along an adjoining edge of the first and second portions, each portion having an internal device receiving surface and an external device protecting surface. The linking member may be operable to permit the first and second portions to move between closed and open states. In the closed state, opposing lateral edges of the first and second portions may be in communication thereby forming a protective shell for the computing device defined between adjoining external device protecting surfaces of the first and second portions. One or more device fastening members may be disposed on each of the first and second portions. The linking member may be integrally formed with the first and second portions of the case or detachably connected to one or both of the first and second portions.

A method of protecting a computing device is also disclosed herein. The method may include detachably connecting a leading edge of a base portion of the computing device to one or more device receiving members of a first portion of a case; securing a trailing edge of the base portion of the computing device to the first portion of the case, the first portion of the case operably to substantially envelope the base portion of the computing device; and detachably connecting a plurality of perimetral fastening members of a second portion of the case to one or more perimetral edges of a screen portion of the computing device.

The method may also include forming a protective shell around the computing device by pivoting adjoining edges of the first and second portions of the case about a linking pliable member in communication with the trailing edge of the computing device; securing an upper edge of the screen portion to the perimetral fastening members; and positioning the upper edge of the screen portion in communication with the leading edge of the base portion of the computing device so that external protective surfaces of the first and second portions of the case are generally flush.

The method may also include recessing the linking pliable member into the first and second portions of the case and/or positioning at least one of the perimetral fastening members between corners of the second portion. The method may also include detachably connecting an upper edge of the screen portion to one of the perimetral fastening members centrally positioned on a corresponding upper edge of the second portion.

A variety of methods and systems of utilizing and assembling the disclosed case is also contemplated in a variety of situations and environments. To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Figure 1:
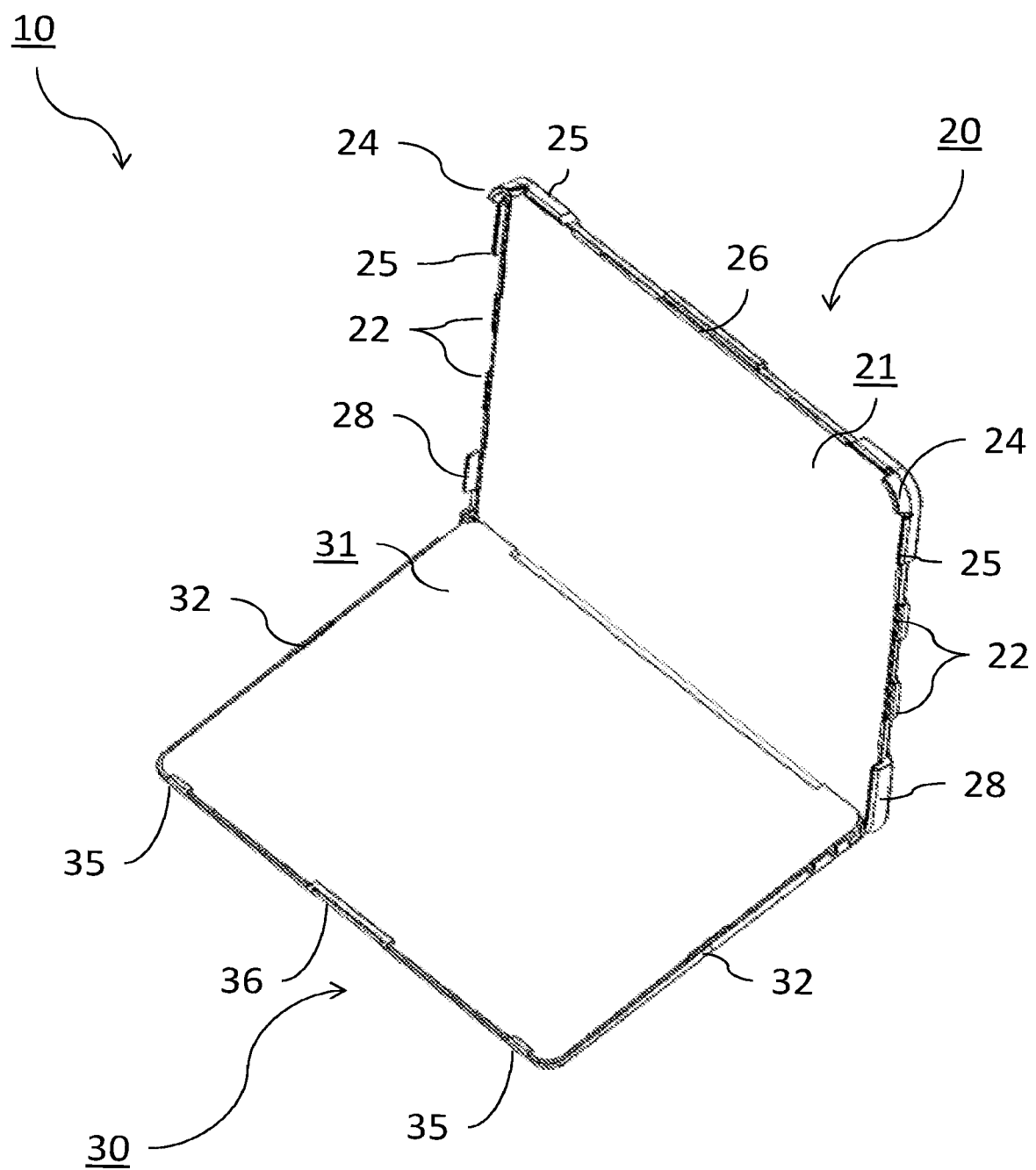
FIG. 1 is a forward perspective view of the herein described protective case for a computing device in an opened state.

The features of the presently disclosed solution may be economically molded or assembled by using one or more distinct parts and associated components which, may be assembled together for removable or integral application with a known or to-be-designed computing device case in an economical manner, wherein the features of the present disclosure may form the herein disclosed servicing apparatus regardless of the particular form. Unless defined otherwise, all terms of art, notations and other scientific terms or terminology used herein have the same meaning as is commonly understood by one of ordinary skill in the art to which this disclosure belongs.

Terms with commonly understood meanings may be defined herein for clarity and/or for ready reference, and the inclusion of such definitions herein should not necessarily be construed to represent a substantial difference over what is generally understood in the art. All patents, applications, published applications and other publications referred to herein are incorporated by reference in their entirety. If a definition set forth in this section is contrary to or otherwise inconsistent with a definition set forth in the patents, application, published applications and other publications that are herein incorporated by reference, the definition set forth in this section prevails over the definition that is incorporated herein by reference.

As used herein, 11a" or 11an" means 11at least one" or "one or more." As used herein, the term "user", "subject", "end-user" or the like is not limited to a specific entity or person. For example, the term "user" may refer to a person who uses the systems and methods described herein, and frequently may be a technician. However, this term is not limited to end users or technicians and thus encompasses a variety of persons who can use the disclosed systems and methods.

The disclosed solution can now be better understood turning to the following detailed description. It is to be expressly understood that the illustrated embodiments are set forth as examples and not by way of limitations on the embodiments as ultimately defined in the claims. An embodiment in accordance with the present disclosure provides a cover for a computing device such as a laptop, a smart phone, a tablet or any other portable computing device. The cover can be made of multiple parts, integrally formed therewith or detachable.

It is understood that "computing device" can mean any device such as a laptop, a smart phone, a tablet computing device, PDAs or the like.

"Shield" as used herein with the disclosed case can mean to protect, wrap around, or envelope a corresponding computing device in a manner that conceals the computing device from: injuries during a drop or accident such as by impact or collision; scrapes and scratches during or between uses; and/or other injuries to the outer surfaces and internal mechanisms of the device.

"Impact resistant" or "impact resistance" as it relates to the herein disclosed case features can mean any feature designed to withstand applied forces or related shock across the disclosed case and any device housed therein. Accordingly, features or materials described herein as providing impact resistance or being impact resistant utilize material properties and/or structural design of the case directed towards mitigating the effects of expected events in the life-cycle of the case and corresponding computing device that incur impact (e.g. drops, collisions, accidents, etc).

"Honeycomb design" as described herein is contemplated to signify any natural or man-made structure such as a plastic injected mould or composite sandwich structure that includes geometry of a honeycomb. This structure may reinforce structural integrity in the feature it is included and/or may also allow the minimization of the amount of used material to optimize feature weight and material costs.

The herein disclosed solution described a case capable of exhibiting the shock resistant benefits of a case with elastomeric edges, corners or other outer portions combined with the consumer usability benefits of a resilient outer case such as relatively stronger plastics. The herein described solution may also be a composite case with some combination of one or more elastic materials with one or more harder, resilient materials, such as injection molded plastic and/or rubber, in a way that forms a permanent bond therebetween resulting in a protective system that sufficiently securely retains and protects a computing device in most operating conditions including, but not limited to, the standards set forth by MIL-STD 810G, 506.6 VI. The herein disclosed solution also contemplates a composite case in which the geometric shape of the constituent components maximizes overall structural strength and impact resistance while minimizing material weight and size.

For simplicity and illustration purposes only, the presently disclosed case 10 is depicted for use with a laptop 100 though the solution is not so limited and could be used with other referenced computing devices as understood in the context of this disclosure and other numerous consumer electronic devices, wherein case 10 would employ similar details, features and benefits. Turning to the figures, FIG. 1 depicts a case 10 having upright portion 20 and base portion 30 in an opened state. In this respect, portions 20 and 30 may be directly attached to each other or linked between a linking member 5 as described more particularly below. Each of portions 20 and 30 have device receiving surfaces 21 and 31 disposed internal to respective portions 20 and 30. Surfaces 21 and 31 may be constructed from different or the same material as remaining surfaces of portions 20 and 30 and may be relatively rigid and/or comprise materials operable to reduce impact applied to external device protecting surfaces 27 and 37.

Regarding portion 30, one or more device receiving fastening members may be positioned along its forward or lateral edges. Preferably, a central receiving fastening member 36 is positioned on the leading edge of portion 30 and operable to securely receive the corresponding leading edge of device 100 when slidably and/or detachably received by portion 30. Portion 30 may also include one or more peripheral leading edge receiving fastening members. Members 35 and/or 36 may extend away from surface 37 and preferably terminate in a device retaining portion. In a preferred embodiment, members 35 and 36 including an inwardly extending portion operable to receive and secure the leading edge of device 100. Portion 30 may also included a peripheral edge that guides each of the corresponding lateral edges of device 100 until device 100 contacts and is secured to members 35 and/or 36.

While it is preferred that members 35 and/or 36 be relatively rigid and/or include impact resistant materials, the herein disclosed case 10 is not so limited. Instead, as seen more particularly in FIG. 12, device 100 may be slid or otherwise guided along portion until its leading edge is in communication with members 36 and 35. One or both of members 35 and 36 may be capable of securely retaining device 100 at this point. Members 35 and 36 may have an inwardly extending portion that retains device 100 as described, case 10 is not so limited and members 35 and 36 may instead include grip inducing members, bolts, couplings, cables, clamps, hooks, hook and loop fasteners or the like.

Portion 30 may also include peripheral guide members 32 positioned along perimetral edges of portion 30 to guide corresponding members 35 and 36. Members 32 may also fasten, secure, or otherwise retain device 100 in portion 30. Preferably, portion 32 may be positioned apart from but comprise an extending (e.g., lip) surface oriented in the same general plane of direction as surface 31 to form a guide between which device 100 can be slid. Portion 30 may be flexible, locally or generally, when portions of device 100 are inserted, contacted, or otherwise in communication with members 32, 35, and 36. In one embodiment, portion 30 may flex outwardly, inwardly, or some combination thereof as needed to conform and securely receive device 100. It should also be noted that flexing of one edge does not necessarily cause opposing edges of the same portion 30 to flex.

Turning to portion 20, it can be seen that device receiving surface 21 is positioned internal to and surrounding by perimetral edges with associated fastening or support members. Portion 20 is preferably designed to securely receive and provide impact resistance and protection to a screen portion of device 100, wherein the screen may be hingedly or otherwise connected to a keyboard or capacitive input portion of device 100 either directly or indirectly (e.g. wirelessly) that is securely received by portion 30. Portion 20 may have the same or similar material properties as portion 30 or portion 20 may be substantially more impact resistant than portion 30.

Portion 20 may have one or any number of fastening members to rapidly and easily secure the screen to portion 20. Preferably, a central fastening member 26 is positioned along an upper edge of portion 20 between upper corners of portion 20. Member 26 may extend outwardly from surface 21 and including an inwardly extending lip or planar portion operable to communicate with and mechanically secure the corresponding upper edge of the screen of device 100. It is understood that surface 21 may be operable to contact the outer, protective surface of the rear portion of screen so that the display portion of the screen is oriented away from portion 20.

One or more corners of portion 20 may include a corner fastener member 24 operable to securely, detachably, and/or rapidly fasten to corresponding corners of the screen. Member 24 may be constructed from a relatively impact resistant material that may be flexible and/or elastic. In this regard, member 24 may securely fasten the screen of device 100 as well as mitigate any damage resulting from loads or unexpected impact applied to its upper corners. Member 24 may include a corner retaining portion so that when the corner of the screen is passed along or adjacent to member 24, member 24 may outwardly flex until the corner of the screen is in communication with surface 21. Member 24 may then be released back towards surface 21 to secure the corner of the screen positioned therebetween.

Member 24 may include an inwardly extending portion or lip retaining groove or pocket for receiving screen. Adjacent to member 24 may be one or more peripheral corner fastening members 25. Members 25 may extend away from surface 21 and may also including an inwardly extending portion or lip retaining groove for receiving and securing the screen of device 100. Members 25 may be planar with corresponding member 24. Members 25 may include the same or similar elastic and/or flexible materials as member 24 and may be detachable with surface 21 or integrally formed therewith. Preferably, however, member 24 may extend further than member 25 and may be formed of a different material than member 25. For example, member 25 may be constructed from materials having different resistance properties or resiliency. In a preferred embodiment, the lip retaining groove of member 25 is generally planar with member 24 so that a secure, friction fit may be formed and supported between the perimetral edge of the screen and members 24 and 25.

However, case 10 is not so limited and members 25 and 28 may be designed so that the screen of device 100 does not contact either in a closed state. In other words, device 100 may be free floating with the only engaged portion being the other side of case 10. In this embodiment, peripheral fastener member 22 may contact the screen portion of device 100.

Peripheral fastener members 22 may also be positioned along one or both lateral edges of portion 20 to securely and quickly engage with the lateral edges of the screen of device 100. Members 22 may also include an outwardly extending portion operably to engage with device 100 through, for example, a lip retaining portion or groove.

Figure 2:
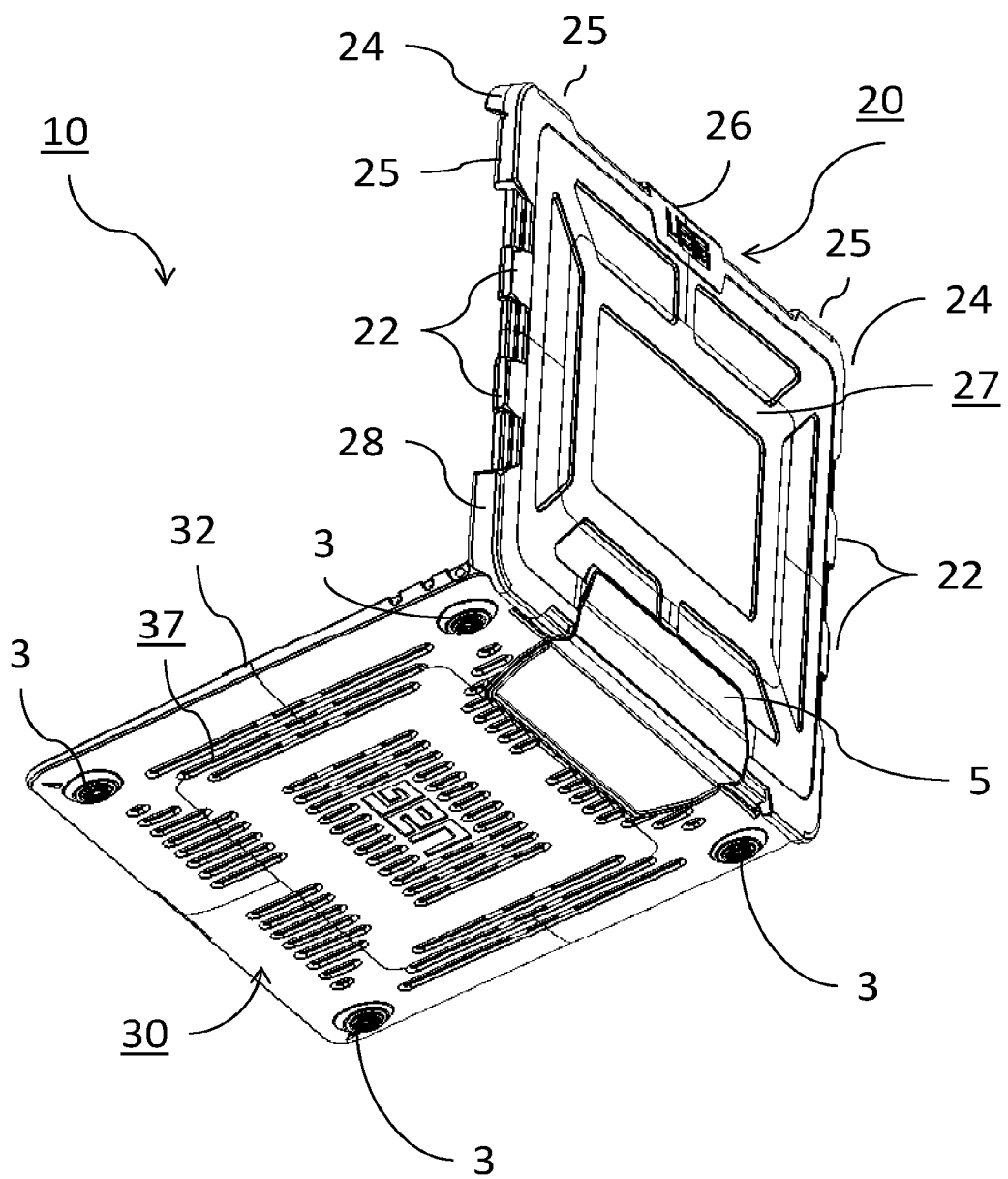
FIG. 2 is a rear perspective view of the herein described protective case for a computing device in an opened state.

In FIG. 2, external device protecting surfaces 27 and 37 of respective portions 20 and 30 can be seen. As can be seen, some or all of the foregoing fastening members of portion 20 may be integrally connected through a single piece of impact resistant and/or elastomeric material positioned along the perimeter of portion 20. In this respect, loads applied to one or more of the foregoing fastening members of portion 20 may be distributed while the relatively, more rigid remaining portions of the external device protecting surface 27 may be operable to maintain structural integrity of case 10 during use such as a drop or an impact. For example, case 10 in a closed state may be formed in a shell, bubble, or be otherwise bowed to protect from impact.

Portion 30 may also include one or more shock resistant pedestals 3 to structurally support portion 30 and any device 100 housed therein. Surface 37 may include any pattern or array of cutout features to trim weight and/or provide cooling ducts for intake into a thermal management system of device 100 or otherwise provide ventilation to device 100 while still maintaining structural integrity therein. Pedestals 3 may be removably attached to portion 30 or integrally formed therewith. Pedestals 3 may also include grip inducing surfaces disposed on its lower portion.

As can also be seen, portions 20 and 30 may be hingedly or pivotally connected along adjoining edges so that case 10 is capable of moving between an opened state (FIG. 1) or a closed position (FIGS. 3-4) through adjoining linking member 5. Linking member 5 may preferably be pliable and attached in recesses of each of portions 20 and 30. However, case 10 is not so limited and instead member 5 may be rigid and capable of biasing between open and closed states about a respective rotational axis aligned with adjoined edges of portions 20 and 30. Member 5 may be constructed from one or a combination of a polymer, elastomer, fabric, and plastic and may measure at least one half of the total edge length of portions 20 and 30.

Figure 3:
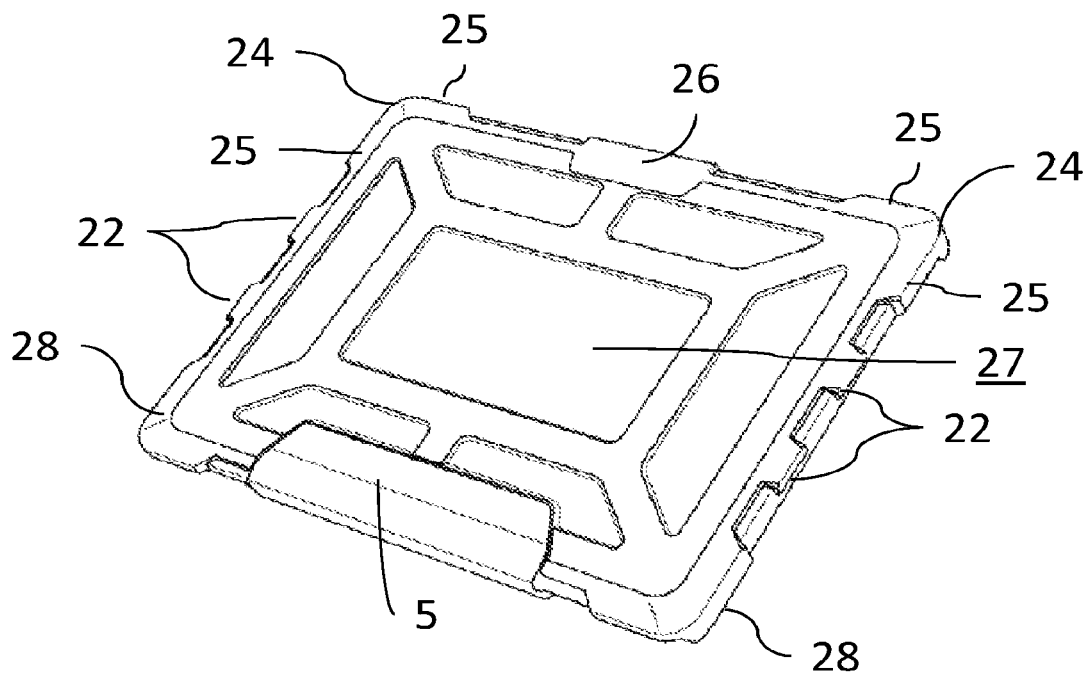
FIG. 3 is an upper perspective view of a portion of the case of FIGS. 1-2.
Figure 4:
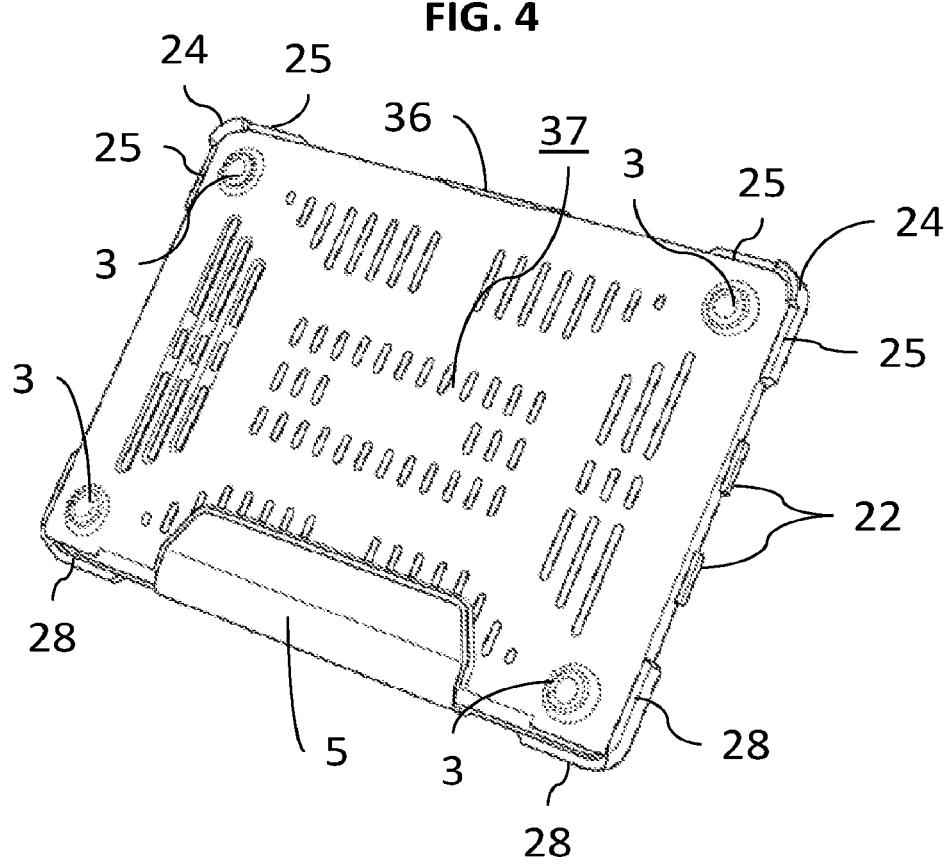
FIG. 4 is a lower perspective view of a portion of the case of FIGS. 1-2.
Figure 5:
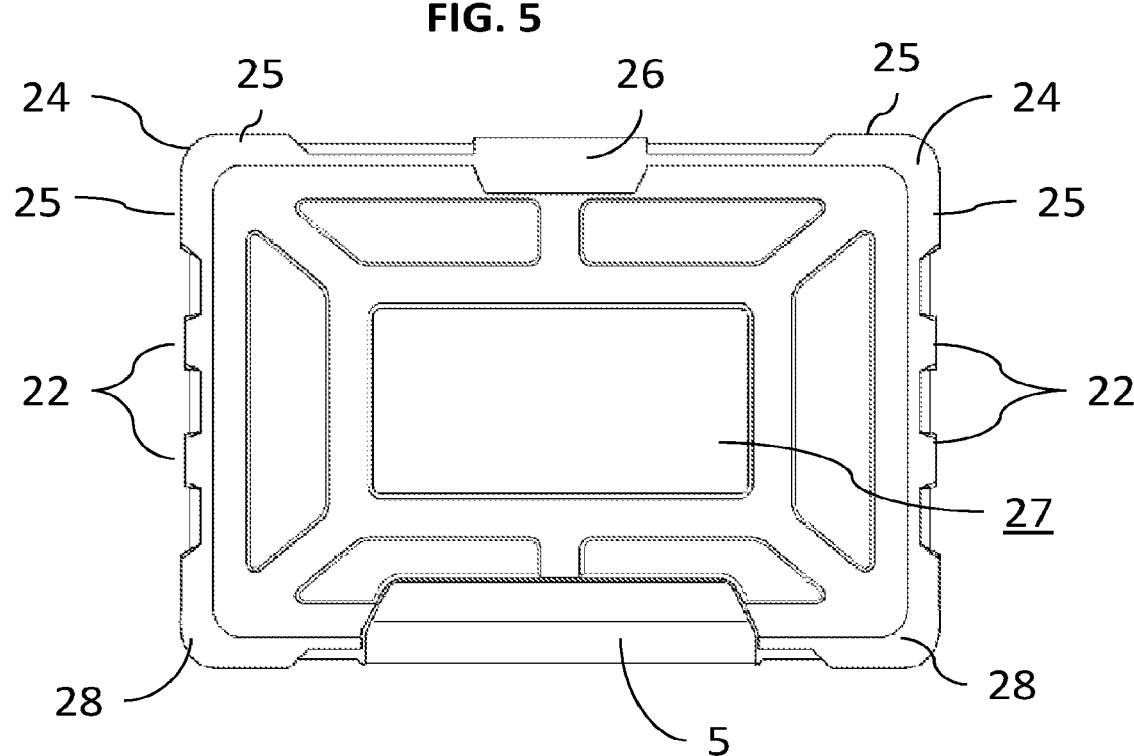
FIG. 5 is a top plan view of the portion of FIG. 3.
Figure 6:
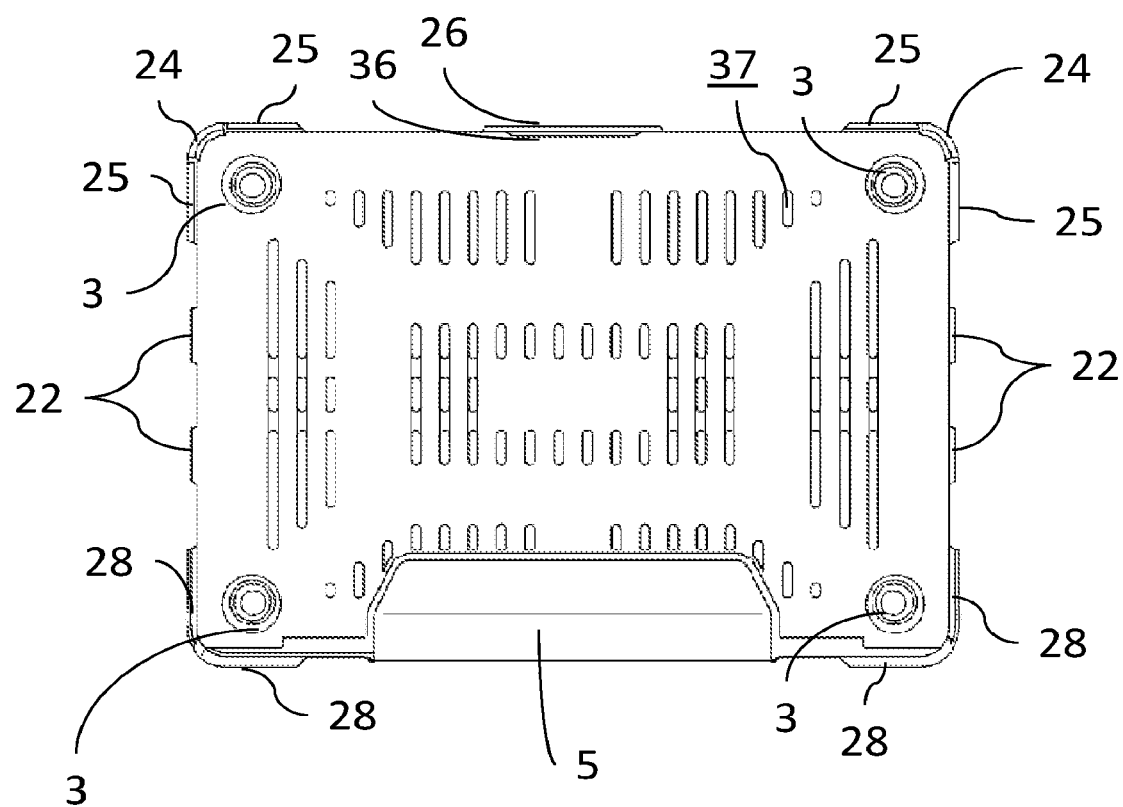
FIG. 6 is a bottom plan view of the portion of FIG. 4.

FIG. 3 depicts a similar embodiment but instead case 10 is now in a closed state such that portion 20 and specifically surface 27 and corresponding fastening members and linking member 50 can be seen. FIG. 5 depicts a top plan view of the embodiment of FIG. 3. In contrast, FIG. 4 depicts case 10 of FIG. 3 but turned over so that portion 30 can be similarly seen. Similarly, FIG. 6 depicts a bottom plan view of the embodiments of FIG. 4. As can be seen, case 10 in the closed state of FIGS. 3-4 forms an inner, protective shell operable to securely retain, envelope, and shield a computing device 100.

Figure 7:
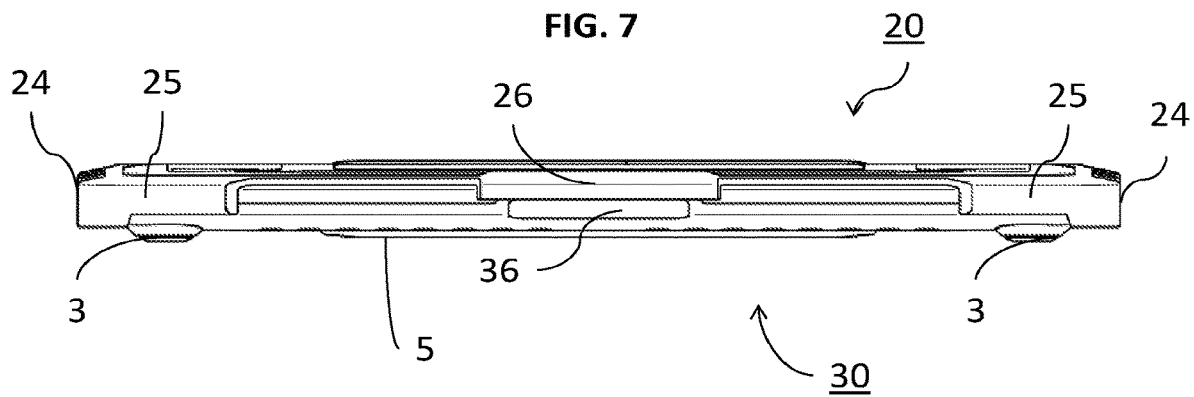
FIG. 7 is a front plan view of the case of FIG. 1 in a closed state.
Figure 8:
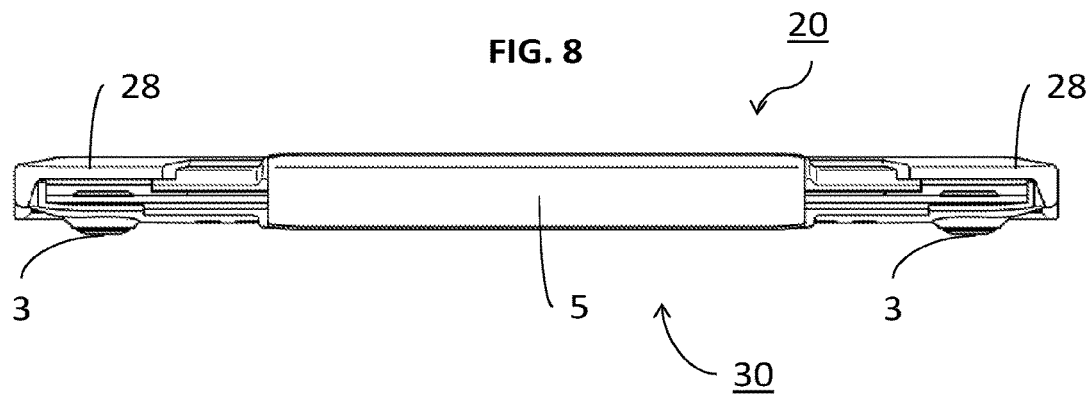
FIG. 8 is a rear plan view of the case of FIG. 1 in a closed state.
Figure 9:
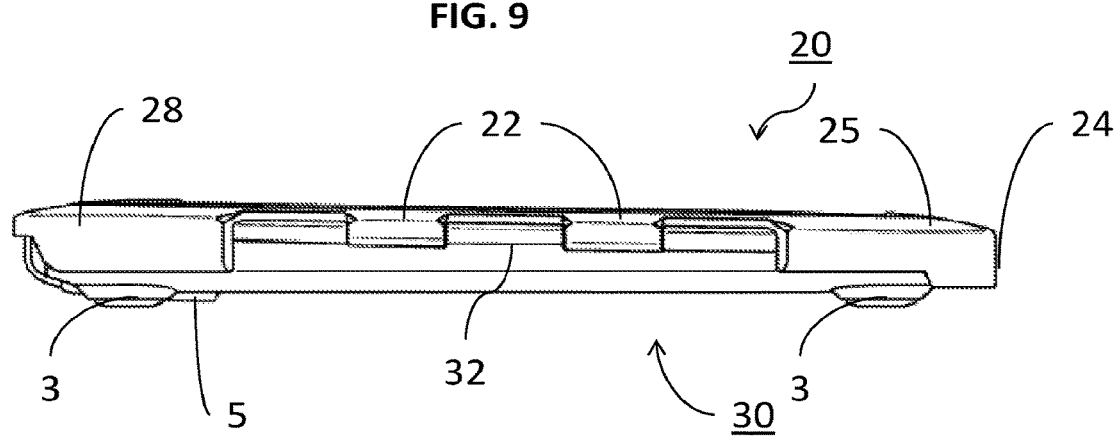
FIG. 9 is a right side plan view of the case of FIG. 1 in a closed state.
Figure 10:
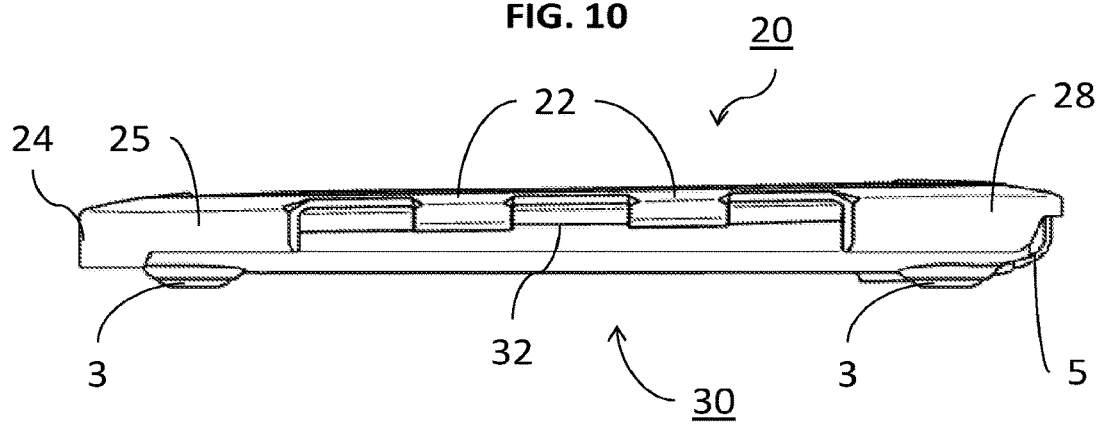
FIG. 10 is a left side plan view of the case in a closed state.

FIG. 7 depicts a front side view of case 10 in a closed state. In this respect, differing depths of lip portions of members 24 and 25 are visible as well as spatial relationships between members 26 and 36 when device 100 may be securely housed inside closed case 10. In contrast, FIG. 8 depicts a rear side view of case 10 so that member 5 can be clearly seen linked around and/or wrapping engaged with each of portions 20 and 30. Differing depths of member 28 as compared its extension away from surface 21 of portion 20 can also be seen. FIG. 9 depicts an exemplary case 10 also in a closed state from a right plan view. In this respect, members 22 may be seen in terms of exemplary depth of respective lip retaining portions as well as one manner in which members 22 may be connected to each other as well as members 24 and 25. FIG. 10 depicts the opposite side of case 10 also in a closed state, wherein case 10 in this embodiment is symmetric with the embodiments depicted in FIG. 9. However, case 10 is not so limited and each of its sides and features may not be symmetrically positioned or aligned as needed or required to quickly and easily attach and protect any number of devices 100.

Figure 11:
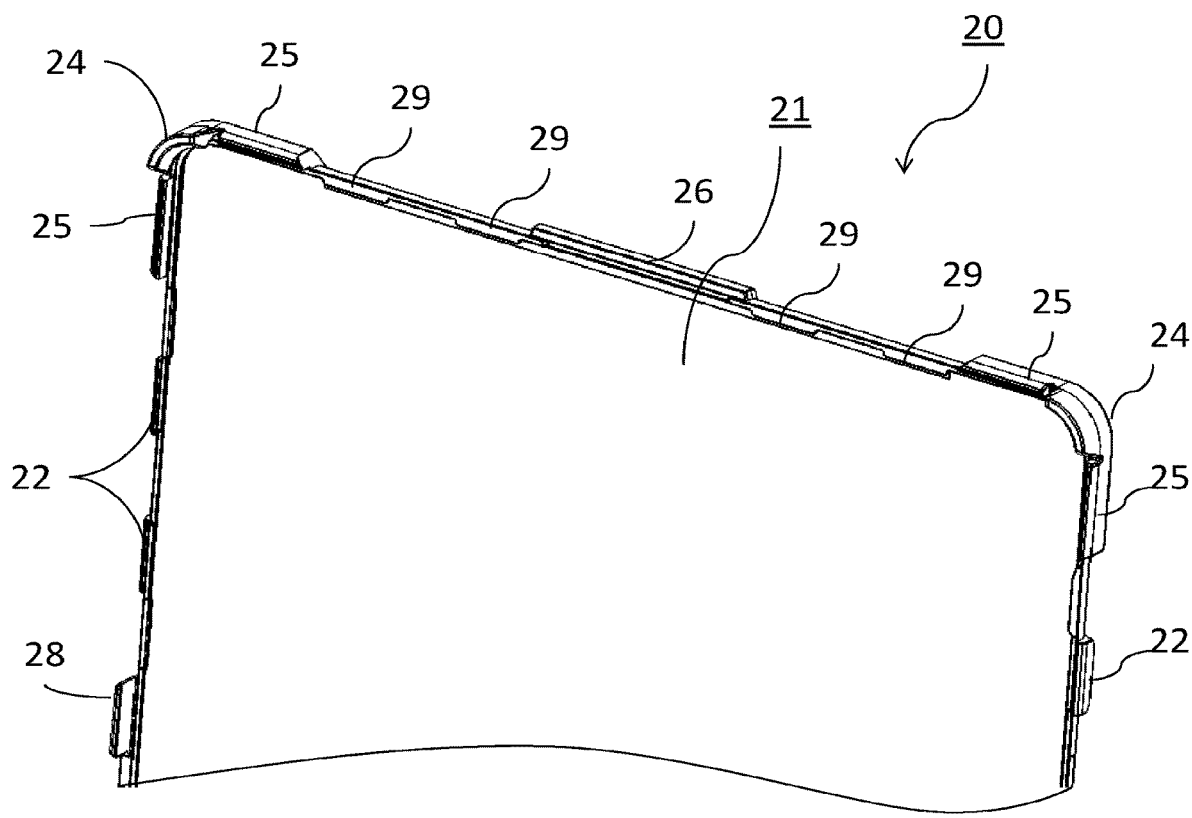
FIG. 11 is a close up view of the internal service of the portion of FIG. 3.

FIG. 11 depicts a perspective view of a close up an exemplary portion 20 to more clearly depict optional depths and positions of previously described fastening members in relation to surface 21. As can be seen, optional trimmed portions or slits may be positioned between members 25 and 24 to permit increased outward and/or inward flexing when detachably securing device 100 thereto.

Portions 20 and/or 30 may also include any number optional cutout windows and/or actuator surfaces or cutouts positioned along respective perimeter edges. Such features may be formed by being trimmed or cut therefrom by the end-user or by being integrally formed therewith according to particular device 100.

Figure 12:
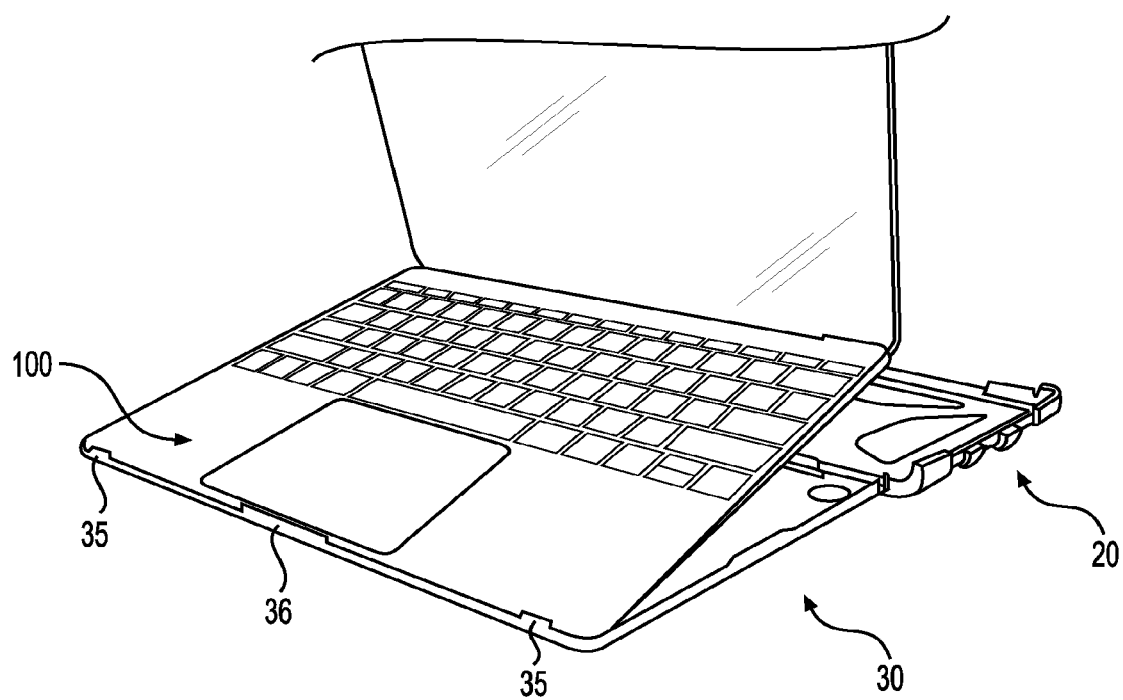
FIG. 12 depicts a perspective of the leading edge of an exemplary computing device being connected to the case of FIGS. 1-11.
Figure 13:
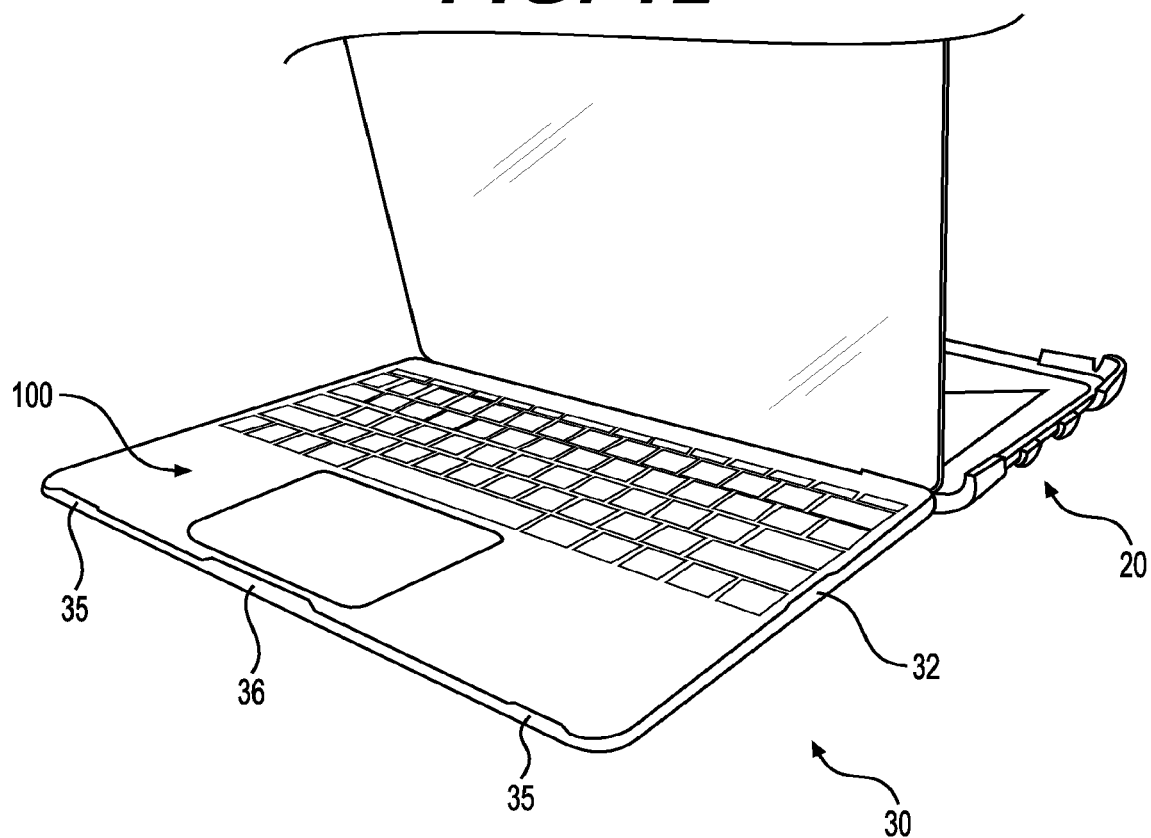
FIG. 13 depicts a perspective view of trailing edge of the exemplary computing device being connected to the case of FIGS. 1-11.
Figure 14:
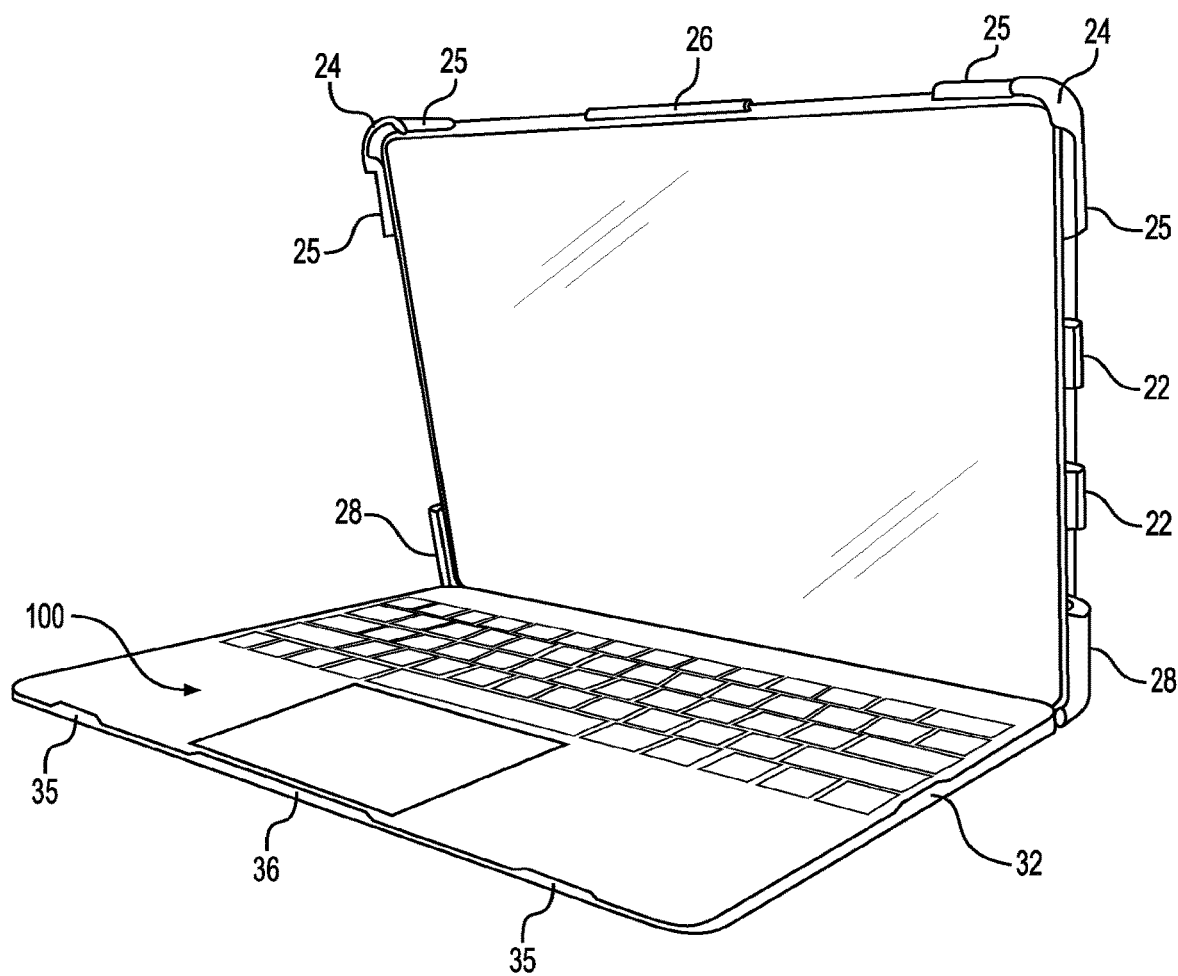
FIG. 14 depicts a perspective view of the screen portion of the exemplary computing device being connected to the case of FIGS. 1-11.
Figure 15:
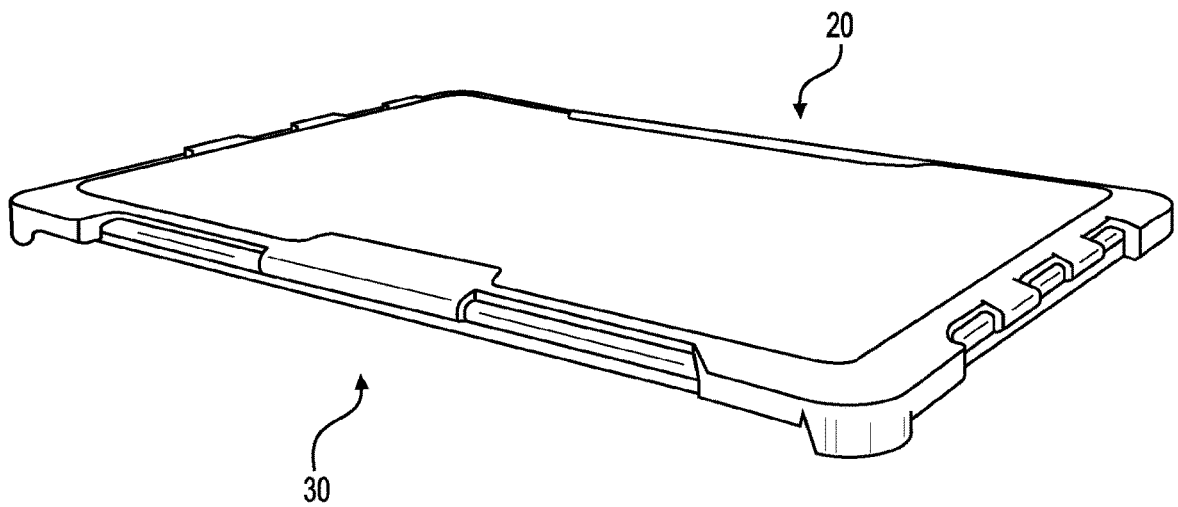
FIG. 15 depicts a perspective view of the embodiment of FIG. 14, wherein the case and computing device are depicted in a closed state.

In a preferred embodiment, a method of protecting device 100 is disclosed for use with case 10. Specifically, FIG. 12 depicts a perspective of the leading edge of an exemplary computing device being connected to case 10 being securely engaged with members 35 and 36. After being slid, engaged or fastened with members 35 and 36, the base of device 100 be positioned in contact with surface 31 as seen in FIG. 3. Members 32 may have flexed outwardly during engagement until its upper, lip retaining portion is situated on top of the base of device 100. Having secured the base of device 100 to portion 30, FIG. 14 depicts adjoining portion 20 having been moved about adjoining edges of portions 20 and 30 through member 5 until fastening members of portion 20 are secured to device 100. As seen, portion 20 may be moved by being pivoted, rotated, or flexibly translated about member 5 until members 22, 24, 25, and 28 securely and rapidly fasten to the screen of device 100. Finally, FIG. 15 depicts a perspective view of device 100 having been secured to case 10 and in a closed state so that device 100 is completely shielded and enveloped by the protective shell formed between portions 20 and 30.

Figure 16:
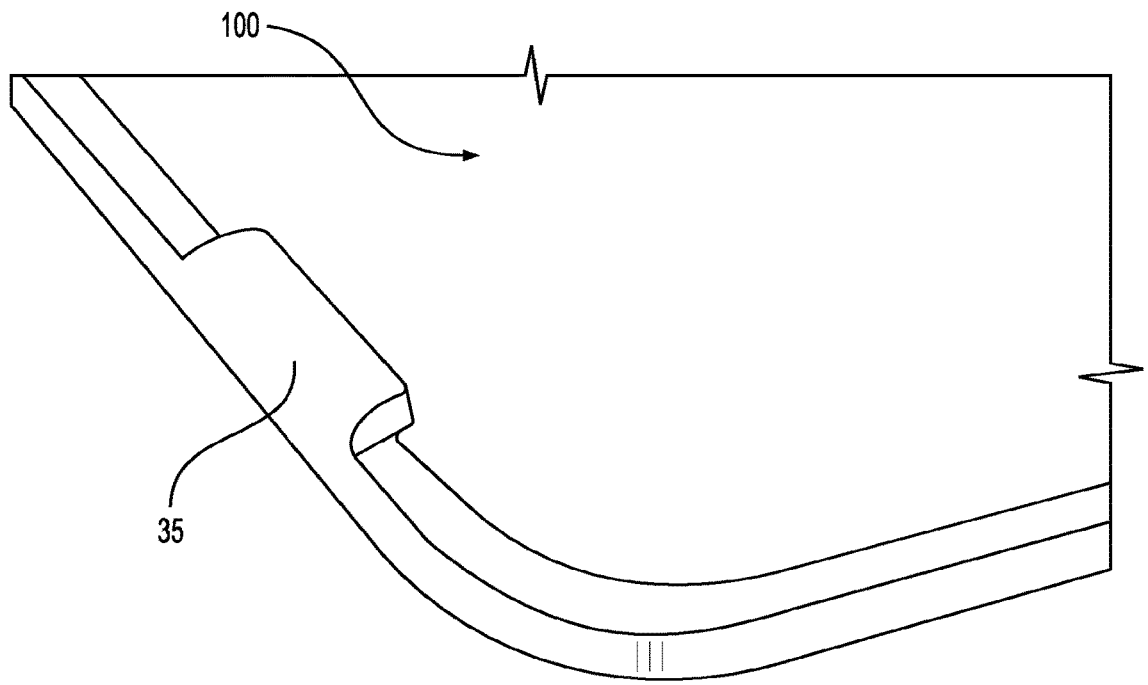
FIG. 16 is a close up view of an exemplary fastening member of one embodiment of the case in communication with the leading edge of the computing device.
Figure 17:
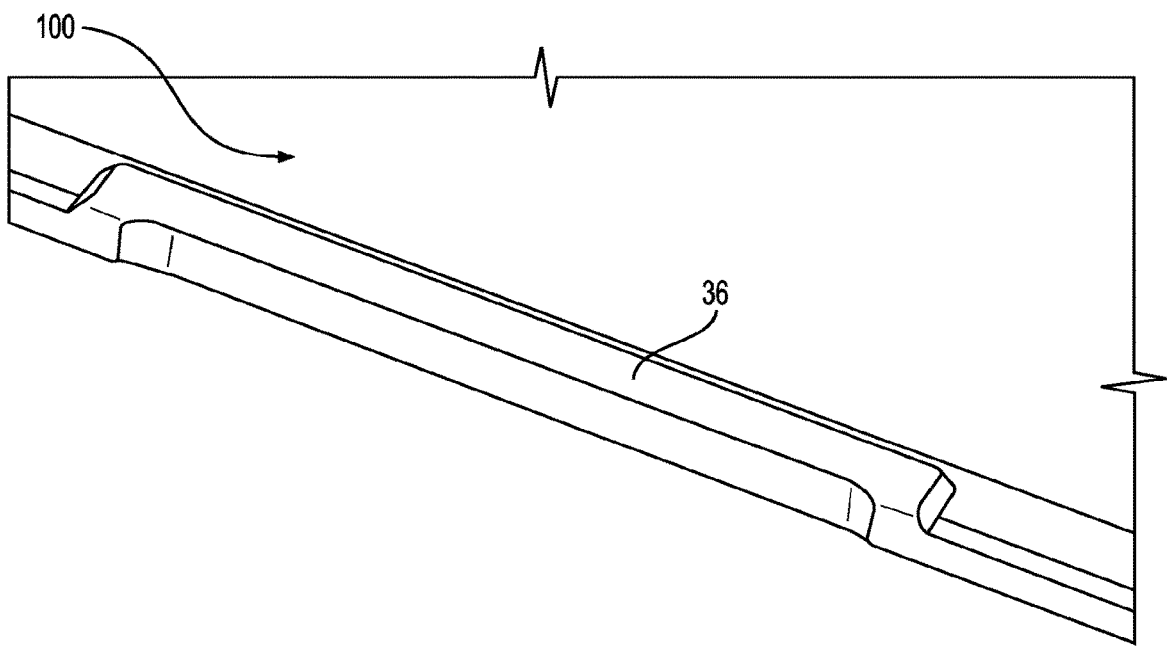
FIG. 17 is a close up view of another exemplary fastening member of one embodiment of the case in communication with the leading edge of the computing device.

FIG. 16 depicts a close up view of member 35 being disposed adjacent to a corner of portion 30 and corresponding corner of the leading edge of device 100. Similarly, FIG. 17 depicts a close up view of exemplary member 36 in communication with the leading edge of device 100. In this respect, preferred depths that members 35 and/or 36 extend away from surface 31 can be seen but members 35 and/or 36 are not so limited and any number of depths and/or device retaining portions may be included as need or desired.

Figure 18:
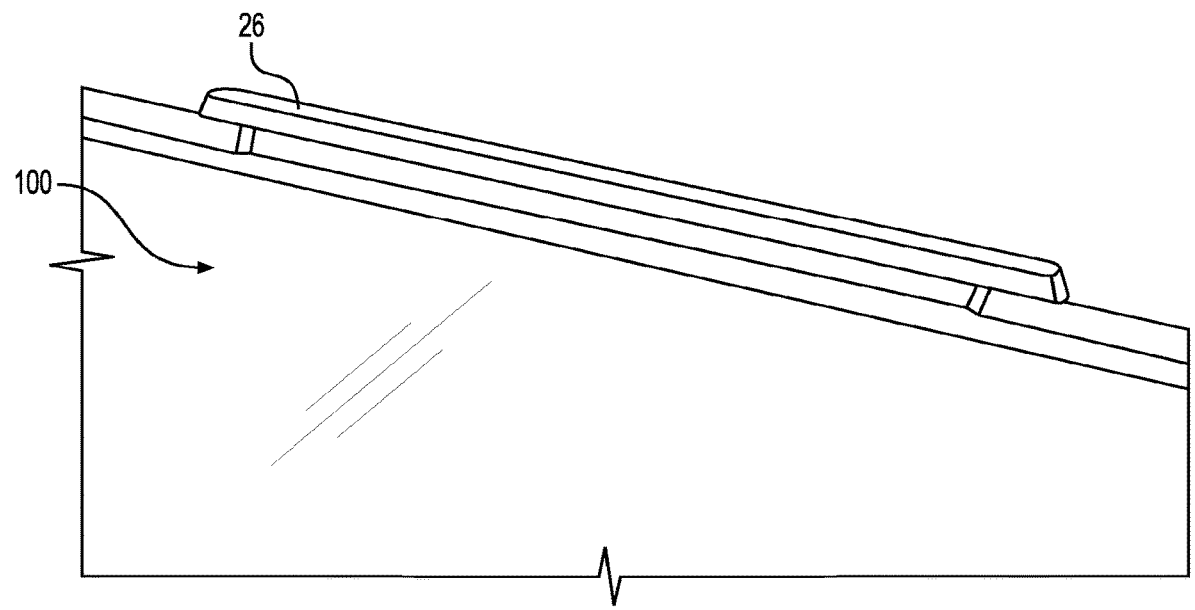
FIG. 18 is a close up view of one exemplary fastening member of one embodiment of the case in communication with the upper edge of the screen portion of the computing device.
Figure 19:
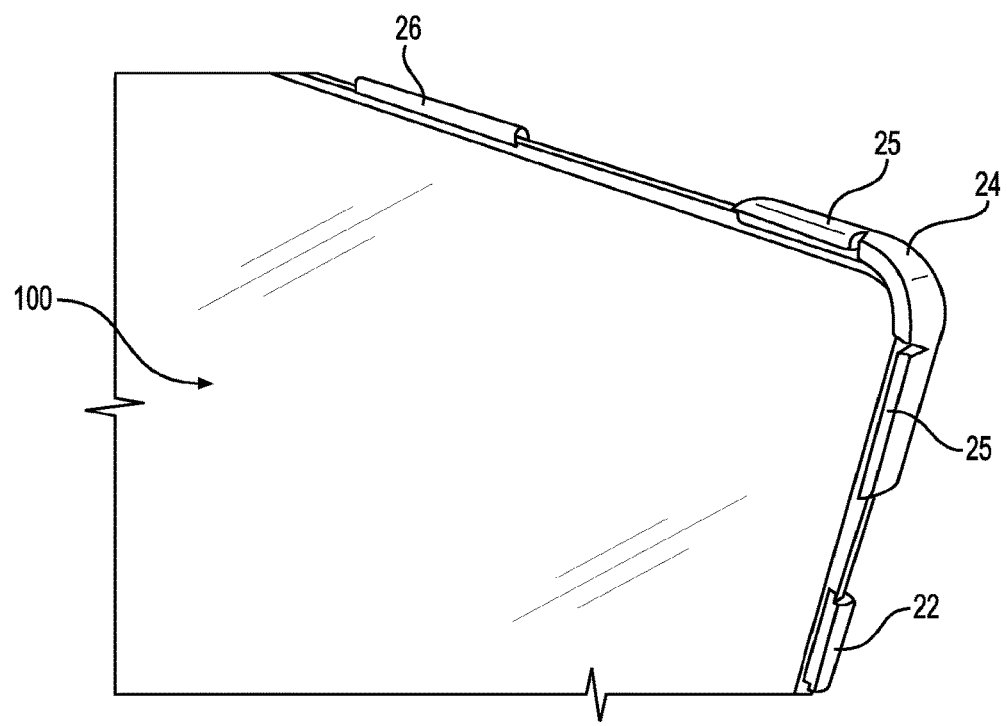
FIG. 19 is a close up view of other exemplary fastening members of one embodiment of the case in communication with the upper edge of the screen portion of the computing device.

FIG. 18 depicts a close up view of exemplary member 26 in communication with the upper edge of the screen portion of device 100. Similarly, FIG. 19 depicts a close up view of members 22, 24, 25, and 26 in communication with the upper edge of the screen portion of device 100. In this respect, preferred and/or ratios of depths as between members 22, 24, 25, and 26 that respective members may extend away from surface 31 is depicted but members 22, 24, 25, and/or 26 are not so limited and any number of depths, slits, and/or device retaining portions may be included as need or desired.

Figure 20:
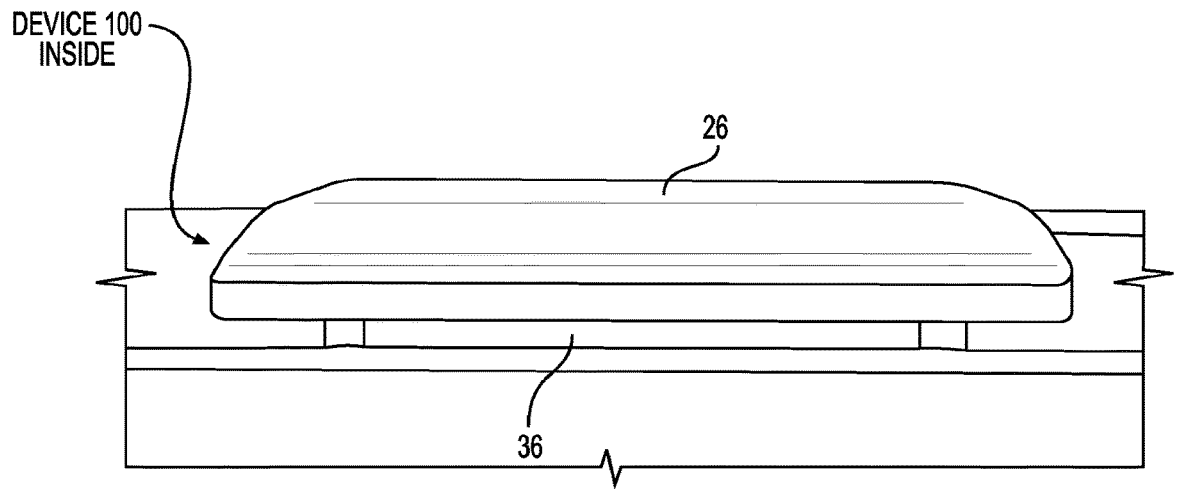
FIG. 20 is a dose up view of an exemplary fastening member of one embodiment of the case, wherein the case and computing device are in a dosed state.
Figure 21:
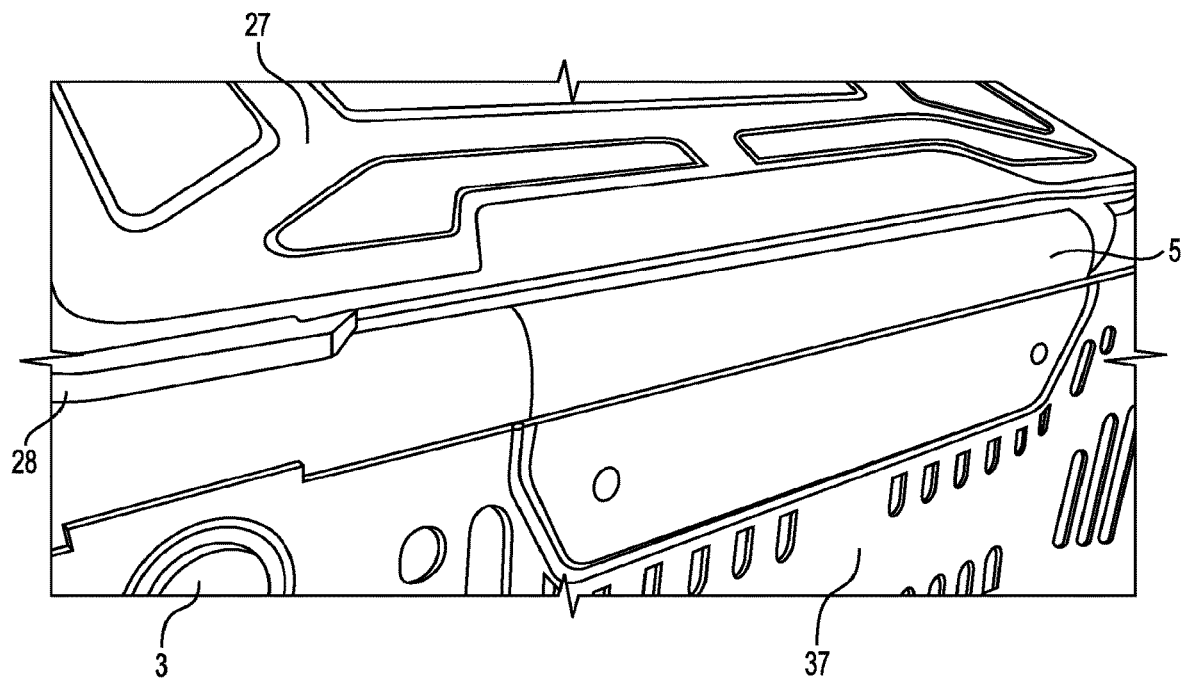
FIG. 21 is a dose up view of an exemplary linking member disposed between adjoined portions of one embodiment of the herein disclosed case.

Finally, FIG. 20 depicts an exemplary members 26 and 36 when case 10 and device 100 are in a closed state and FIG. 21 depicts a close up view of an exemplary member 5 disposed between adjoined portions 20 and 30 of one embodiment of the herein disclosed case 10. To release the secure engagement between portions 20 and 30 from each other and/or corresponding device 100, a predetermined force or movement may be applied to respective fastening members so that portions 20 and/or 30 may be moved about member 5 and/or release device 100 away from case 10 entirely.

It is to be understood the portions 20 and 30 preferably completely or substantially envelope device 100 when device 100 is securely engaged therewith and case is in a closed state. This is particularly advantageous in the art as no ancillary features or stands are required to customize the computing experience with a particular device 50, safely transport said device 50 between operating environments, while ultimately protecting from the expected and unexpected accidents that tend to occur with computing devices.

Portions 20 and 30 may be integrally formed with each other or may be detachable as needed or preferred. Preferably, portion 20 and its features may be constructed from an injection molded TPU rubber but portion 20 is not so limited and it may be fabricated from a variety of materials. As can be seen throughout this disclosure, when device 100 is received and securely retained by portion 20 of case 10, case 10 and corresponding device 100 are substantially coexistive so that case 10 sufficiently protects device 100 and avoids injurious actions befalling device 100, including impacts, sharp objects, shock and scratches to the graphical user interface, display screen, or outer surfaces of device 100. As can be seen, case 10 can easily and securely retain device 100 while also having the capability to secure device 100 in case 10 during a variety of operating environments including, but not limited to, an accidental or intentional drop. Advantageously, the described case 10 amply protects device 100 yet does not interfere with access to buttons, ports, or the device 100's graphical display.

The definitions of the words or elements of the following claims are, therefore, defined in this specification to not only include the combination of elements which are literally set forth. It is also contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination(s).

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what incorporates the essential idea of the embodiments.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A case for a computing device, the case comprising:
   a first portion operatively connected to a second portion, each portion having an internal device receiving surface and an external device protecting surface; and
   a plurality of corner fastening members operable to detachably fasten to the computing device, wherein each corner fastening member includes a central portion disposed between corresponding shoulder portions, and wherein for each corner fastening member, the central portion is operable to flex outwardly when detachably fastening to and securely enveloping a corner portion of the computing device.

2. The case of claim 1, further comprising:
   one or more device receiving members disposed on the first portion; and
   a plurality of perimetral fastening members disposed on the second portion, each perimetral fastening member operable to detachably fasten to the computing device, wherein perimetral edges of the first and second portions are operable to flex outwardly when detachably fastening to and securely enveloping a perimetral portion of the computing device.

3. The case of claim 2, wherein at least one of the perimetral fastening members is centrally positioned on an upper edge of the second portion.

4. The case of claim 3, wherein the at least one perimetral fastening member that is centrally positioned extends outwardly from the device protecting surface and terminates in an inwardly extending lip.

5. The case of claim 4, wherein each of the plurality of perimetral fastening members is operable to flex outwardly.

6. The case of claim 5, wherein the inwardly extending lip secures the computing device when the computing device is in communication with the device receiving surface of the second portion.

7. The case of claim 1, wherein the plurality of corner fastening members are disposed in opposing corners of the second portion.

8. The case of claim 1, wherein the plurality of corner fastening members extend outwardly from the device protecting surface and terminate in a lip portion to secure respective corner portions of the computing device.

9. The case of claim 8, wherein for each of the plurality of corner fastening members, an inwardly extending portion of the lip portion is operable to form a friction fit with the respective corner portion of the computing device.

10. The case of claim 1, wherein the central portion of each corner fastening member extends outwardly further than the corresponding shoulder portions of each fastening member.

11. The case of claim 1, wherein the plurality of corner fastening members are constructed from material more rigid than a remainder of the second portion, and wherein a slit is positioned between the central portion and each shoulder portion.

12. The case of claim 1, wherein the internal device receiving surfaces and the external device protecting surfaces of each portion are flexibly connected along adjoining edges through a pliable fastening member.

13. The case of claim 12, wherein the pliable fastening member extends at least across one-half length of a total length of the adjoining edges.

14. The case of claim 13, wherein the pliable fastening member extends partially into a recess of each of the first and second portions.

15. The case of claim 13, wherein the case is operable to pivot or rotate about an axis of the pliable fastening member between closed and open states.

16. The case of claim 15, the first portion and the second portion each further comprising a plurality of perimetral fastening members;
   wherein in the closed state, the perimetral fastening members of the first and second portions are centrally positioned on opposing lateral edges and are in communication to form a shell defined between adjoining external device protecting surfaces of the first and second portions.

17. The case of claim 13, wherein the pliable fastening member is integrally formed with the first and second portions of the case or detachably connected to one or both of the first and second portions.

18. The case of claim 1, wherein the at least one of the first and second portions further comprise a structural reinforcement portion disposed on the external device protecting surface internal to a perimetral edge.

19. The case of claim 1, further comprising an external shield portion integrally formed with or detachably connected to the first or second portions of the case.

20. The case of claim 19, wherein the external shield portion comprises one or a plurality of impact resistant corners or perimetral members.

\* \* \* \* \*